United States Patent [19]

Cunningham

[11] 4,356,460
[45] Oct. 26, 1982

[54] SPLIT PHASE DELAY EQUALIZER WITH REDUCED INSERTION LOSS

[75] Inventor: Vernon R. Cunningham, Melissa, Tex.

[73] Assignee: Rockwell International Corporation, El Segundo, Calif.

[21] Appl. No.: 214,299

[22] Filed: Dec. 8, 1980

[51] Int. Cl.$^3$ ............................................. H03H 11/12
[52] U.S. Cl. ................................... 333/28 R; 330/294
[58] Field of Search .............. 333/28 R, 138; 330/151, 330/294

[56] References Cited

U.S. PATENT DOCUMENTS

| | | | |
|---|---|---|---|
| 3,421,101 | 1/1969 | Drew et al. | 330/294 |
| 3,517,223 | 6/1970 | Gaunt, Jr. | 333/28 R X |
| 4,311,872 | 1/1982 | Davis | 330/294 X |

OTHER PUBLICATIONS

A. H. Naegeli, "IF Filters for the 8901A Modulation Analyzer", *Hewlett Packard Journal*, Nov. 1979, p. 10.
H. Shiki et al., "IF Variable Equalizers for FM Microwave Radio Links", *IEEE Transactions on Communications*, vol. COM-22,7, Jul. 1974, pp. 941-950.
V. Cunningham, "Design Single Section Delay Equalizers", *Electronic Design 19*, Sep. 13, 1976, pp. 82-87.
S. Rosenfield et al., "Group Delay Equalization in Communications Systems", *Comstron Application Data Bulletin 175*, pp. 1-9.
Arthur B. Williams, "Unconventional Active Filters", *Active Filter Design*, 1975, pp. 93, 95, 97, 99, 100.
Miguel, *Preamplifier for a Wideband Antenna*, Rev. Esp. Electron (Spain), vol. 24, No. 271, Jun. 1977, pp. 34, 35.

*Primary Examiner*—Paul L. Gensler
*Attorney, Agent, or Firm*—Bruce C. Lutz; Howard R. Greenberg; H. Fredrick Hamann

[57] ABSTRACT

A split phase delay equalizer is provided which reduces loss without resorting to high values of load impedance. The equalizer has a pair of parallel circuit branches, one of which is through the base and collector of a transistor, and the other through a reactance network connected between the collector and base of the transistor.

7 Claims, 2 Drawing Figures

SPLIT PHASE DELAY EQUALIZER WITH REDUCED INSERTION LOSS

TECHNICAL FIELD

The invention relates to delay equalizers used to compensate for unwanted delay variations in filters, telephone lines, microwave radio links, and other equipment used for signal transmission. The invention more particularly relates to delay equalizers of the split phase type.

BACKGROUND

Delay equalizers are well known in the art, and generally provide an increased delay at or around a resonant frequency at which a filter or the like exhibits a reduced delay, to compensate for the latter. Delay equalizers of the split phase type are known and encompass a variety of configurations, including transistor split phase delay equalizers, for example, as shown in "IF Filters For the 8901 A Modulation Analyzer," Andrew H. Naegeli, Hewlett-Packard Journal, November 1979, p. 10.

SUMMARY

The present invention provides an improved transistor split phase delay equalizer which is particularly simple and efficient. The equalizer circuit substantially reduces transmission loss.

In one desirable aspect of the invention, loss is reduced without resorting to high values of load impedance which may otherwise cause frequency response problems in the 70 MHz range.

In another desirable aspect of the invention, only a single transistor is needed. The reactance network is provided in a feedback loop to the base of the transistor to be connected in parallel therewith to the input and provide two parallel circuit branches combined at an output.

DETAILED DESCRIPTION

Figure 1:
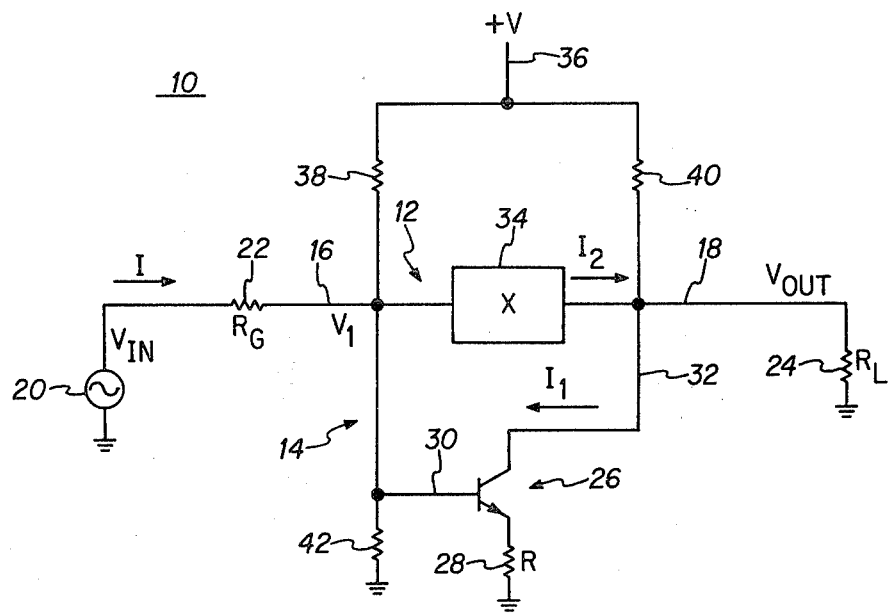
FIG. 1 is a circuit diagram of a split phase delay equalizer constructed in accordance with the invention.

Delay equalizer 10 includes a pair of circuit branches 12 and 14 connected in parallel between input 16 and output 18. AC signals are delivered from generator 20 through generator impedance 22, having a value $R_G$, through branches 12 and 14 to load impedance 24 having a value $R_L$.

Circuit branch 14 has a transistor 26 for providing a 180 degree phase inversion of the signal in branch 14. The base of transistor 26 is connected to input 16, the collector of transistor 26 is connected to output 18, and the emitter of transistor 26 is connected to ground through a resistance 28, having a value R. The transistor provides 180 degree phase inversion of the signal on collector lead 32 relative the signal on base lead 30.

Figure 2:
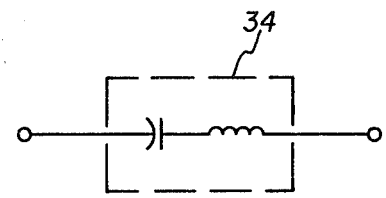
FIG. 2 illustrates a series LC circuit for reactance network 34 of FIG. 1.

Circuit branch 12 has a reactance network 34, having a value X. An example of a reactance network is a series LC circuit, FIG. 2. Transistor 26 provides 180 degree phase inversion of the signal in branch 14 relative the signal in branch 12. Reactance network 34 further phase shifts the signal in branch 12 relative to the signal in branch 14. This phase shift occurs around the resonant frequency of network 34, and, when the two signals are recombined, causes an increased delay around the resonant frequency. This increased delay may be used to compensate the reduced delay of a filter or other device at a given frequency.

DC biasing is provided by a DC voltage source 36 connected through resistors 38 and 40 to input 16 and output 18, and resistor 42 connected from base lead 30 to ground. DC-blocking capacitors (not shown) may be provided between input 16 and impedance 22, between output 18 and load impedance 24, and in circuit branch 12 between input 16 and reactance 34.

Equalizer 10 thus has a pair of parallel circuit branches 12 and 14, one of which has a phase-inverting transistor 26. Reactance network 34 may be in the same or opposite circuit branch as transistor 26. Reactance network 34 is preferably connected in feedback relation from the collector of transistor 26 to the base of transistor 26, and impedance 28 is connected from the emitter of transistor 26 to ground or a potential reference level common with that to which output 18 is connected through impedance 24. In an alternate embodiment, impedance 28 and reactance network 34 are interchanged.

The present invention provides reduced insertion loss, and does so without using high values of load impedance and the susceptibility to the stray capacitance associated therewith which would otherwise cause response problems at high frequency.

Equations (1) through (5) are the loop equations for the circuit of FIG. 1 (base to emitter signal voltage assumed negligible in comparison to the voltage across R, bias and base currents assumed negligible in comparison to signal currents).

$$V_1 = I_1 R \tag{1}$$

$$V_{in} = IR_G + V_1 \tag{2}$$

$$V_1 = I_2 X + V_{out} \tag{3}$$

$$V_{out} = R_L(I_2 - I_1) \tag{4}$$

$$I = I_2 \tag{5}$$

Substituting Equations (5) and (1) into Equation (2) yields Equation (6).

$$V_{in} = I_2 R_G + I_1 R \tag{6}$$

Substituting Equations (5) and (3) into Equation (2) yields Equation (7).

$$V_{in} = I_2 R_G + I_2 X + V_{out} \tag{7}$$

Solving Equation (4) for $I_1$ yields Equation (8).

$$I_1 = \frac{I_2 R_L - V_{out}}{R_L} = I_2 - \frac{V_{out}}{R_L} \tag{8}$$

Substituting Equation (8) into Equation (6) yields Equation (9).

$$V_{in} = I_2 R_G + RI_2 - \frac{RV_{out}}{R_L} \tag{9}$$

Solving Equation (7) for $I_2$ yields Equation (10).

$$I_2 = \frac{V_{in} - V_{out}}{R_G + X} \tag{10}$$

Substituting Equation (10) into Equation (9) yields Equation (11).

$$V_{in} = R_G\left(\frac{V_{in} - V_{out}}{R_G + X}\right) + R\left(\frac{V_{in} - V_{out}}{R_G + X}\right) - \frac{RV_{out}}{R_L} \tag{11}$$

Expanding Equation (11) yields Equation (12).

$$V_{in} = \frac{R_G}{R_G + X} V_{in} - \frac{R_G}{R_G + X} V_{out} + \frac{R}{R_G + X} V_{in} - \frac{R}{R_G + X} V_{out} - \frac{R}{R_L} V_{out} \tag{12}$$

Rearranging Equation (12) yields Equation (13).

$$V_{out}\left(\frac{R_G + R}{R_G + X} + \frac{R}{R_L}\right) = V_{in}\left(\frac{R_G + R}{R_G + X} - 1\right) \tag{13}$$

Solving Equation (13) for the transfer function T, which is the ratio of the output voltage to the input voltage, yields Equation (14).

$$T = \frac{V_{out}}{V_{in}} = \frac{\frac{R_G + R}{R_G + X} - 1}{\frac{R_G + R}{R_G + X} + \frac{R}{R_L}} \tag{14}$$

Expanding Equation (14) yields Equation (15).

$$T = \frac{\left(\frac{R_G + R - R_G - X}{R_G + X}\right)}{\left(\frac{R_G R_L + RR_L + RR_G + XR}{(R_G + X)R_L}\right)} \tag{15}$$

Simplifying and canceling terms in Equation (15) yields Equation (16).

$$T = \frac{R - X}{\left(\frac{R_G R_L + RR_L + RR_G + XR}{R_L}\right)} \tag{16}$$

Further simplifying Equation (16) yields Equation (17).

$$T = \frac{R - X}{\left[\frac{R}{R_L}\left(R_L + R_G + \frac{R_G R_L}{R} + X\right)\right]} \tag{17}$$

Comparing the form of a generalized transfer function recognized in the literature with the particular transfer function of the circuit of FIG. 1 in Equation (17), it will be recognized that the particular all-pass condition for the circuit of FIG. 1 is shown in Equation (18).

$$R = R_G + R_L + \frac{R_G R_L}{R} \tag{18}$$

Multiplying both sides of Equation (18) by R yields Equation (19).

$$R^2 = RR_G + RR_L + R_G R_L \tag{19}$$

Rearranging Equation (19) into quadratic form yields Equation (20).

$$R^2 - (R_G + R_L)R - R_G R_L = 0 \tag{20}$$

Solving Equation (20) for R using the quadratic equation yields Equation (21).

$$R = \tfrac{1}{2}\left[R_G + R_L + \sqrt{(R_G + R_L)^2 + 4R_G R_L}\right] \tag{21}$$

Equation 21 gives the required value of R for given value of $R_Q$ and $R_L$ for the circuit of FIG. 1. The flat loss A for equalizer 10 is given by Equation (22), $$A = (R_L/R) \tag{22}$$

Rearranging Equation (22) yields Equation (23).

$$R = (R_L/A) \tag{23}$$

Substituting Equation (23) into Equation (18) yields Equation (24).

$$\frac{R_L}{A} = R_G + R_L + \frac{R_G R_L}{\frac{R_L}{A}} \tag{24}$$

Simplifying Equation (24) yields Equation (25).

$$R_L = AR_G + AR_L + A^2 R_G \tag{25}$$

Rearranging Equation (25) yields Equation (26).

$$\frac{R_L}{R_G} = A + A\frac{R_L}{R_G} + A^2 \tag{26}$$

Rearranging Equation (26) yields Equation (27).

$$\frac{R_L}{R_G} - A\frac{R_L}{R_G} = A(A + 1) \tag{27}$$

Simplifying Equation (27) yields Equation (28).

$$\frac{R_L}{R_G} = \frac{A(A + 1)}{1 - A} \tag{28}$$

Equation (28) thus gives the ratio of $R_L$ to $R_G$ in terms of the loss.

If $R_L$ equals $R_G$, then solving Equation (28) for A yields Equation (29).

$$A = \sqrt{2} - 1 = 7.66 \, dB \tag{29}$$

6 dB of this loss occurs without equalizer 10 being present, i.e., terminating the generator into a load by connecting impedance 22 directly to impedance 24, where $R_L = R_G$, drops the level at the output of impedance 22 by 6 dB. The insertion loss of equalizer 10 is therefore only 1.66 dB.

The insertion loss of equalizer 10 can be made zero if a certain ratio is established between $R_L$ and $R_G$. To determine this ratio, A is set equal to ½ in Equation (28). This value of A equal to ½ represents the generator load termination loss of 6 dB. Substituting the value A equals ½ into Equation (28) results in Equation (30).

$$R_L = \frac{3}{2} R_G \quad (30)$$

An example of an implementation of Equation (30) is $R_L = 75$ ohms and $R_G = 50$ ohms. These are realizable values at 70 megahertz with good response characteristics.

Equalizer 10 can thus reduce the insertion loss to only 1.66 dB with equal generator and load impedances, or reduce the insertion loss to zero dB with a load impedance value one and a half times the value of the generator impedance. Loss is reduced without resorting to very high $R_L$ values and/or very low or zero $R_G$ values. High $R_L$ values result in very low loss but cause response problems at high frequency, such as 70 megahertz.

It is recognized that various modifications are possible within the scope of the appended claims.

I claim:

1. A split phase delay equalizer using a single transistor which has a transfer function complying with the Equation $$T = \frac{R - X}{M\left[\frac{RL}{R}(RL + RG + \frac{(RG \cdot RL)}{R} + X)\right]}$$

where R is a transistor gain stabilizing resistor as referenced infra,
where RL is the load resistance seen by the equalizer,
where RG is the signal source resistance seen by the equalizer, and
where X is the impedance of a circuit branch as referenced infra, comprising, in combination:
a pair of circuit branches connected in parallel between an input and an output;
a transistor in one of said pair of circuit branches for providing a 180 degree phase inversion of the signal in that branch;
a reactance means X in the other one of said pair of circuit branches for providing a phase shift of the signal in that branch;
a resistance means R connected in circuit with the transistor in said one of said pair of circuit branches, said equalizer receiving signals from a generator having an impedance of RG and connected to supply signals to a load having a resistance value RL; and
means connecting the base of said transistor to said input and connecting one of the emitter and collector of said transistor to the output, wherein said reactance means is connected in feedback relation from said one of the emitter and collector of said transistor to the base of said transistor.

2. The invention according to claim 1 wherein said transistor and said reactance means are in opposite circuit branches, and wherein the base of said transistor is connected to said input, and wherein said reactance means is connected in feedback relation around said transistor.

3. The invention according to claim 2 wherein the other of said emitter and collector of said transistor is connected through said resistance means R to a potential reference level common with that to which said output is connected through the impedance RL, the circuit values being adjusted for minimal insertion loss without resorting to high values of RL which would otherwise cause high frequency response problems.

4. The invention according to claim 3 wherein said input includes the impedance RG, and wherein said insertion loss is approximately 1.66 dB when RG equals RL.

5. The invention according to claim 3 wherein said input includes an impedance RG, and wherein $$R = \tfrac{1}{2}\left[RG + RL + \sqrt{(RG + RL)^2 + (4RG \cdot RL)}\right].$$

6. The invention according to claim 3 wherein said input includes the impedance RG, and wherein said insertion loss is approximately zero if $$RL = \frac{3}{2} RG.$$

7. The invention according to claim 6 wherein the value of RL is approximately 75 ohms and the value of RG is approximately 50 ohms, and said equalizer provides frequency response in the 70 megahertz range.

* * * * *